United States Patent [19]

Sugihara et al.

[11] Patent Number: 4,839,736

[45] Date of Patent: Jun. 13, 1989

[54] FILTER FOR CRT SCREEN

[75] Inventors: Eiichi Sugihara, Zushi; Hideo Amemiya, Yokohama; Koji Hayafune, Tokyo, all of Japan

[73] Assignee: Mitsui Toatsu Chemicals, Inc., Tokyo, Japan

[21] Appl. No.: 154,303

[22] Filed: Feb. 10, 1988

[30] Foreign Application Priority Data

Jul. 6, 1987 [JP] Japan .............................. 62-168205
Dec. 22, 1987 [JP] Japan .............................. 62-322696

[51] Int. Cl.$^4$ .............................................. H04N 5/72

[52] U.S. Cl. .................................... 358/253; 358/245; 358/252; 313/478

[58] Field of Search ............... 358/245, 247, 252, 253, 358/255; 313/478, 417

[56] References Cited

U.S. PATENT DOCUMENTS

| | | | |
|---|---|---|---|
| 2,436,847 | 3/1948 | Wolfson | 358/253 |
| 3,378,636 | 5/1965 | Hamilton | 178/78.2 |
| 3,679,451 | 7/1972 | Marks et al. | 358/252 |
| 3,736,050 | 5/1973 | Bolum | 358/252 |
| 3,873,868 | 3/1975 | Robinder | 358/252 |
| 4,253,737 | 3/1981 | Thomsen et al. | 350/276 |
| 4,631,214 | 12/1986 | Hasegawa | 428/68 |
| 4,755,716 | 7/1988 | Hayafune et al. | 313/478 |

FOREIGN PATENT DOCUMENTS

| | | |
|---|---|---|
| 0145201 | 3/1985 | Australia . |
| 12107 | 1/1980 | Japan . |
| 32653 | 4/1981 | Japan . |
| 126054 | 8/1982 | Japan . |
| 94337 | 5/1984 | Japan . |
| 106176 | 6/1984 | Japan . |
| 107802 | 6/1985 | Japan . |
| 125681 | 7/1985 | Japan . |
| 15480 | 1/1986 | Japan . |
| 61-144943 | 7/1986 | Japan . |
| 61-209152 | 9/1986 | Japan . |
| 61-209154 | 9/1986 | Japan . |

*Primary Examiner*—Edward L. Coles, Sr.
*Attorney, Agent, or Firm*—Fisher, Christen & Sabol

[57] ABSTRACT

A CRT filter of the present invention consists of a film having a transparent conductive layer and effectively eliminates the static electricity which are generated from the CRT. Further, after the film previously having the transparent conductive layer was continuously manufactured, it can be laminated onto a nonconductive transparent sheet or plate. The transparent conductive film of a stable quality can be cheaply obtained. Thus, the CRT filter having the excellent static electricity eliminating capability and high resolution is manufactured. On the other hand, the CRT filter of the invention has such a shape as to be closely attached onto the front surface of the CRT. Therefore it is also possible to prevent such a phenomenon that the display image in the corner portion of the screen is blurred without deteriorating the resolution. The operator can continue the work without feeling the fatigue of the eyes and the mental pain.

6 Claims, No Drawings

FILTER FOR CRT SCREEN

FIELD OF THE INVENTION

The present invention relates to a filter for a CRT (Cathode Ray Tube), especially to the same by which the electrostatic charge and electromagnetic waves generated from the CRT can be cut off without deteriorating the resolution of the CRT and adverse effects on the human body by a VDT (Video Display Terminal) having the CRT can be prevented as much as possible, and more particularly, to the filter for the CRT to which a transparent conductive layer is made on the surface of the filter or in an intermediate layer and which is formed as to be closely attached to the front surface of the CRT.

BACKGROUND OF THE INVENTION

The CRT display devices for automatic business machines such as word processors, personal computers, analyzing apparatuses are widely used in offices, homes, or factories. In association with this, the number of operators working in front of the CRT for a long time also increases. The occupational diseases of the operators of the CRT are becoming a social problem. The static electricity which is charged on the CRT display screens can be mentioned as one of the causes of such adverse influences. When the VDT is used, a high voltage is developed on the surface of the CRT provided in the VDT, and in particular, when the switch of the CRT is turned on or off, the high electrostatic charge (having thousand volts or more) is generated on the CRT surface. When the static electricity is charged on the screen, the dust around the screen is absorbed, images may be spoiled in quality, giving an unpleasant feeling to the operators of the CRT. On the other hand, some of the dust absorbed to the CRT surface are springed back by the CRT surface, irritating the eyes and the skin of face of the operators. Further, when the finger or the like of the operators touches the CRT surface or the edge of the CRT filter which is not treated by a conductive material, the operators sometimes receive an electric shock. Furthermore, in the worst case, a computer or the like which is being used causes a malfunction due to the noise which is generated when the static electricity is discharged.

As the CRT and housing thereof are ordinarily formed of nonconductive materials, it is difficult to eliminate the electrostatic charge on the CRT surface.

In general, to prevent the static electricity charged on the surface of plastics or the like, it is desirable to coat a surface-active agent thereonto. However, as the amount of static electricity charged on the surface of the CRT is very large, even if the surface-active agent is coated, the static electricity of tens of thousand volt still remain on the CRT surface for a few seconds, after the switch of the CRT is turned off; in particular in the dry room, the adequate effect to prevent the static electricity is not derived. On the other hand, the surface-active agent is so sticky to absorb the dust, or the coated layer is so uneven that the resolution of the CRT is deteriorated. Further, the surface-active agent coated on the CRT surface does not last long and the effect to prevent the static electricity is gradually weakened.

As a method of eliminating the static electricity on the CRT, there is a method whereby a transparent conductive layer consisting of an oxide of indium and an oxide of tin (hereinafter abbreviated to ITO) or the like is closely adhered by use of an adhesive agent or the like onto the front surface of a glass plate of a shape adapted to be closely adhered onto the surface of the CRT. However, in the case of forming the ITO layer onto the surface of the glass plate, it is necessary to evaporate these conductive materials in the vacuum and to coat onto one or both sides of the glass plate. In order to continuous process of treating a number of glass plates, it is necessary to use an apparatus having a very large processing room; however, it is difficult to install such an apparatus.

On the other hand, there has also been proposed a method to use a flat film, sheet or plate on which a conductive film is disposed as a CRT filter (for example, JP-A-61-209152, JP-A-61-209154, JP-A-62-144943). However, since such a conductive film is not closely attached to the CRT surface, the dust enters into the gap between the CRT screen and the filter, so that the CRT screen surface or filter thereof is stained with the dusts, when cleaning, the conductive material layer can be easily abraded.

A fine ruggedness is formed on the surface of the CRT filter in order to prevent the reflection or flickering. However, when the gap between the CRT surface and the filter is too large, the resolution of the CRT through the filter deteriorates, and there is such a fear that this causes the fatigue of the eyes of the operators.

SUMMARY OF THE INVENTION

It is an object of the present invention to provide a CRT filter in which the electrostatic charge and electromagnetic waves generated from the CRT can be cut off without deteriorating the images of the CRT and an adverse effect on the human body by a VDT having the CRT can be prevented as perfect as possible.

As a transparent conductive layer which is used in the invention, there can be mentioned a thin layer consisting of a metal such as gold, platinum, silver, copper, tin, aluminum, indium, nickel, palladium, antimony, or the like or oxides thereof, in particular, a mixture of ITO is preferable because a high transparence and a high light transmittance of the CRT filter can be obtained. Such a material is processed by a method such as vacuum evaporation, sputtering, ion plating, etc., thereby forming a thick transparent layer. At this time, the long rolled film is put into an apparatus, and slowly fed and rerolled at a constant speed, thereby continuously obtaining a conductive film. With this method, the apparatus to obtain the conductive film can be compacted and small-sized and the manufacturing speed can be improved.

The electric resistance value of the transparent conductive layer needs to be set to 100 kΩ/□ or less such that the static electricity charged on the CRT screen or filter can be eliminated. The transparent conductive layer having an electric resistance value more than that value is improper because the static electricity cannot be sufficiently eliminated.

Further, the filter having the transparent conductive layer whose surface electric resistance value is 200 Ω/□ or less is preferable because it is excellent in shielding property of the electromagnetic waves, and then the electromagnetic waves generated from the front surface of the CRT can be shielded.

On the other hand, it is also possible to dispose two or more of transparent conductive layers. Particularly, in the case of forming the layer made of a metal such as silver, tin, etc., on the layer of ITO, the resultant conductive layer is desirable since the excellent conductivity is derived without deteriorating the transparency of the conductive film.

As a material of a base film, there may be mentioned polyvinylchloride, nitryl resin, polyetherketone, polyethersulfone, polycarbonate, diethyleneglycol-bisallylcarbonate resin, polyethyleneterephthalate, acrylonitrile-styrene co-polymer, methylmethacrylate copolymer, or the like, and in particular, polyethyleneterephthalate is preferable.

A thickness of the base film is from 10 to 250 micron. In the case of the film having a thickness less than 10 micron, its mechanical strength lacks. In the case of the film having a thickness larger than 250 micron, when the transparent conductive layer is formed, it is difficult to take out the film like a roll because of the high rigidity, and further, the processing area per lot is remarkably small; therefore, such a thick film is unpreferable.

An anti-blocking agent, ultraviolet rays absorbent, antistatic agent, dye, pigment, or the like can also be added to the material of the base film by an amount such as not to remarkably deteriorate the adhesive property between the transparent conductive layer and the base film and the light transmittance of them. Further, it is preferable to use a proper adhesive agent to adhear the transparent conductive layer and the base film because the transparent conductive film is hardly peeled off.

The CRT filter in the present invention needs the light transmittance of at least 30% or more at a wavelength of 550 nm. When the light transmittance is less than 30%, the display image of the screen which is seen through the filter is dark, so that it is difficult to see graphics or characters on the screen.

It is desirable to raise the rigidity of the CRT filter of the present invention by laminating the film having a transparent conductive layer and a nonconductive sheet or plate. A thickness of nonconductive sheet or plate which is laminated to the transparent conductive layer is not limited. However, it is preferably 0.1 mm or more and, more preferably, within a range from 0.5 to 10 mm. In the case of the thickness less than 0.1 mm, the rigidity of the filter is not so improved.

As a material of nonconductive sheet or plate, it is preferable to use such a material as not to remarkably deteriorate the light transmittance when it is laminated to the transparent conductive layer. For example, in addition to the foregoing film materials, it is also possible to use a material of a high rigidity such as glass, polymethylmethacrylate, polystyrene, methylmethacrylate-styrene co-polymer, etc.

The transparent conductive layer can be laminated to either one or both sides of the high rigidity sheet or plate. On the other hand, the transparent conductive layer can be sandwiched in by two supporting assistant sheets or plates. When the transparent conductive layer is sandwiched in by two or more sheets or plates, a total thickness of two or more sheets or plates is preferable 0.1 mm or more and, more preferably within a range from 0.5 to 10 mm.

To prevent that the light reflected by the CRT filter surface is slot the operator's eyes, or the scenery around the filter is mirrord on the filter surface, a glossiness [Gs (60°)] of the CRT filter surface on the side opposite to the CRT screen is properly within a range from 40 to 90%. All the well-known methods of adjusting the glossiness are applicable. For example, the following methods can be mentioned: the method whereby the filter surface is made rough by sandblasting or the like; the painting method whereby a paint containing powders of silica, polyethylene, or the like is painted on the filter surface; the method whereby powders of silica, rubber, polyethylene, or the like are mixed into the resin of the material; the method whereby crimps are formed on the surface of the die which is used for injection molding, vacuum molding, or air pressure molding to thereby transfer the crimps on the CRT filter surface; the method whereby the CRT filter is manufactured by use of an original sheet or plate obtained by previously making the surface rough or transferring crimps to the surface or the like; the method whereby a deflecting film is interposed in the filter; and the like.

When the gap between the CRT filter and the CRT screen surface is so large, the light is reflected at two positions on the CRT filter and screen surface. On the other hand, when the glossiness of the filter surface is very low, the resolution of the VDT display image which is seen through the filter deteriorates. Therefore, the CRT filter of the present invention is molded into such a shape as to be closely attached onto the front surface of the CRT. In this case, it is desirable to assemble the VDT apparatus by inserting the CRT filter between the escutcheon of the VDT and the CRT in such a manner that the side of the filter having the conductive film is not exposed to the side opposite to the CRT. This is because not only the conductive portion of the filter is not exposed to the surface of the CRT screen and an accident such as electric shock or electric leak, can be prevented, but also the shielding property of the electromagnetic waves can be improved.

A method of molding the filter into the shape formed as to be closely attached to the front surface of the CRT is not so limited. For example, the film which previously has a transparent conductive layer on the surface or the film laminated with the nonconductive sheet or plate is cut out into a proper size, and thereafter, it is molded into such a shape as to be closely attached to the front surface of the CRT by use of the method such as vacuum molding, air pressure molding. This method is preferable because the CRT filter in which a thickness of transparent conductive layer is uniform is obtained and the production speed is also high.

For the CRT filter of the present invention, it is recommended to use a method whereby the outside of the filter is made of the layer of glass, a method whereby a hard coating agent is coated onto the filter surface, or the like in order to prevent the filter surface from being scratched.

More particularly, it is recommended to provide a hard coating layer, having a hardness above pencil hardness 3H, on the outer surface of the filter which is opposite to the CRT screen. If the hardness of the hard coating layer is below the pencil hardness 3H, the scratching can easily take place of the outer surface of the filter under the ordinary use conditions of the CRT. In the present invention, the pencil hardness is measured according to Japanese Industrial Standard K-5400.

As a hard coating material to form the hard coating layer on the filter, it is possible to use thermosetting type resins such as silicone, epoxy, phenol, melamine resin, ultraviolet ray hardening type resin such as acrylic, urethane resin, and the like.

For the CRT filter of the present invention, a layer made of a conductive fiber or the like can also be formed in or on the surface of the filter so as not to deteriorate the light transmittance to 30% or less. With this layer, the sufficient shielding property of the electromagnetic waves can be obtained even by use of the transparent conductive layer whose surface resistance value is 200 Ω/□ or more.

DETAILED DESCRIPTION OF THE PREFERRED EMBODIMENTS

The present invention will be described hereinbelow with respect to embodiments.

The glossiness Gs (60°) was measured on the basis of JIS K-7105. The surface electric resistance factor was measured by a four probe method in the case where it is 200 kΩ/□ or less. The surface electric resistance factor over 200 kΩ/□ was measured by the model TR-3 (the distance between the measuring terminals is 18 mm) of the Hi-Resistance Tester made by Tokyo Electronics Co., Ltd. The light transmittance was measured at the wave length of 550 nm. The voltage of the static electricity was measured by use of the hand-held type static electrometer "Model 100" (trademark: made by Static Control Service Co., Ltd.) at a distance of 25 mm away from the screen to be measured after the CRT was placed in the circumstances of a temperature of 20° C. and at a humidity of 20% for 24 hours.

EXAMPLE 1

Using a film of polyethyleneterephthalate having a thickness of 0.17 mm on one side of which Nickel was evapor-deposited (the electric resistance was 400 Ω/□), and also the opposite side of which was subjected to the hard coating process (the light transmittance: 50%, the glossiness Gs (60°): 80%, the pencil hardness: 3H), a CRT filter was molded by the air pressure molding method into such a shape as to be closely attached onto the CRT screen in such a manner that its conductive surface is closely adhered onto the CRT screen. The electric resistance, light transmittance, glossiness Gs (60°), and pencil hardness of the molded CRT filter had the same values as those of the film of the material. The CRT filter was cut out to such a size that the periphery of the filter is slightly larger than the escutcheon of the CRT of a size of 14 inches, and then it was inserted between the escutcheon and the CRT screen, and thereafter a conductive two-sided pressure sensitive adhesive tape was sticked to the edge of the CRT filter to ground through a metal band attached to the periphery of the CRT. After the CRT switch was turned on, the static electricity on the CRT screen was measured, the voltage being 50 to 200 V, while the voltage was 100 to 500 V at a moment when the switch was turned off. No electric shock was received even when the finger touched the periphery of the filter. On the other hand, the images of the illumination lights and the like onto the CRT screen and the clearness of the display image on the screen were observed by the eyes; however, no problem was found.

COMPARISON EXAMPLE 1

The ethanol solution of 0.1 weight % as a nonionic surface active agent "ELECTROSTRIPPER EA" (trademark: made by Kao Co., Ltd.) was sprayed to the front surface of the CRT of the size of 14 inches by a spray method, thereby performing the static electricity preventing process (the surface resistance: $10^9$ Ω).

Measuring the static electricity, after the switch of the CRT was turned on, the voltage was 0.5 to 1 kV, while the voltage was 3 to 5 kV at a moment when the switch was turned off. Even when the finger touched the surface of the CRT, no electric shock was received; however, the potential of the CRT surface was higher than that in the Example 1. On the other hand, the surface-active agent of the CRT surface was sticky and when the finger touched the CRT surface, the finger trace remained and the resolution of the VDT deteriorated.

EXAMPLE 2

An ITO layer was continuously formed by an ion plating method onto one side of the film of polyethyleneterephthalate having a thickness of 50 micron, a width of 400 mm, and a length of 200 m (the electric resistance of the ITO film: 0.5 kΩ/□).

The film was cut, and an adhesive-agent was coated onto the surface of the cut film, on the side opposite to the ITO layer (the coating amount: 10 g/m$^2$), to obtain a laminate plate by laminating with a plate of polymethylmethacrylate having a thickness of 2.0 mm, a width of 50 cm, and a length of 2.0 m. This laminate plate was cut out into the size of 400×450 mm, thereby producing the CRT filter of such a shape as to be closely attached onto the CRT screen surface in such a manner that the ITO side was located on the CRT screen side by use of the aluminum die having the shape corresponding to the front surface of the CRT. Mixture liquids were coated by a spray method onto the surface of the CRT filter on the side which is not closely adhered onto the CRT screen surface. These mixture liquids were obtained by mixing 59.6 weight % of a hard coating agent of the ultraviolet rays hardening type "ORESTAR XRA-1358" (trademark: the content of solid matter was 83 weight %), 4.3 weight % of polyethylene powders having an average grain diameter of 5 micron, and 36.1 weight % of ethyl acetate. Then, the coated filter was dried at 50° C. for five minutes. Thereafter, the light of a high pressure mercury lamp of 80 W/cm was irradiated at a distance of 15 cm away from the filter, thereby hardening the surface thereof (the thickness of hard coating layer: 10 micron, the light transmittance: 75%, the glossiness Gs (60°): 70%, the pencil hardness: 7H). Thereafter, the CRT filter was cut out so that the periphery of the filter is slightly smaller than the escutcheon of the CRT of the size of 14 inches. The copper metal fitting was attached to the edge of the CRT filter so as to come into contact with the ITO layer, and using a conductive wire, the metal fitting was connected to an earth terminal of a personal computer to ground. The images of the illumination lights and the like onto the CRT screen and the clearness of the display image on the screen were observed by the eyes; however, no problem occurred. Then the static electricity on the CRT screen were measured. After the switch of the CRT was turned on, the voltage was 50 to 200 V, while the voltage was 100 to 500 V at a moment after the switch was turned off. Even when the finger touched the periphery of the filter, no electric shock was felt. After the CRT filter was used for six months, the static electricity on the CRT screen was further measured. However, the potential did not increase.

COMPARISON EXAMPLE 2

The CRT filter of the shape adapted closely onto the front surface of the CRT was obtained in a manner similar to Example 2, except that the conductive film was not laminated.

The mixture liquids which were obtained by mixing the 59.5 weight % of hard coating agent, 4.3 weight % of polyethylene powders having an average diameter of 5 micron, and 36.1 weight % of ethyl acetate which were similar to those in Example 2 and the 0.1 weight % of surface active agent similar to that in Comparison Example 1, were coated by a spray method onto the surface of the CRT filter on the side which was not closely adhered onto the CRT screen. After drying at 50° C. for five minutes, the light of the high pressure mercury lamp of 80 W/cm was irradiated to the filter from the position of 15 cm away from the filter, thereby hardening the surface of the filter (the thickness of hard coating layer: 10 micron, the light transmittance: 70%, the light glossiness Gs (60°): 70%, the pencil hardness: 7H, the electric resistance: $10^{10}$ Ω). The resultant filter was used as the CRT filter in a manner similar to Example 2. No problem occurred with respect to the formation of images of the illumination light and the like onto the CRT screen and the clearness of the display image on the screen. However, the voltage of the static electricity on the CRT screen was 2 to 3 kV after the switch of the CRT was turned on, while the voltage was 10 to 15 kV at a moment when the switch was turned off and the potential was higher than that in Example 2.

On the other hand, after the CRT filter was used for six months, the surface resistance exceeded to $10^{12}$ Ω, and the voltage of the static electricity was 5 to 6 kV, after the switch of the CRT was turned on, while the voltage was 15 kV or more at a moment after the switch was turned off, and also, when the finger touched the periphery of the filter, an electric shock was felt.

EXAMPLE 3

A conductive net of 200 mesh consisting of 12 denier fibers which were coated with nickel by an electroless plating method (the content of metal: 0.8 g/m$^2$, the surface resistance: 1.0 Ω/□), was laminated as an intermediate layer between two hard vinylchloride resin plates, to form a composite plate having a thickness of 1.5 mm, thus the CRT filter of such a shape as to be closely adhered onto the CRT screen was produced so that the ITO side was located on the CRT side in a manner similar to Example 2 except that the foregoing resin plate was used. The hard coating process was executed to the surface of the filter on the side opposite to the CRT screen in a manner similar to Example 1 (the thickness of hard coating layer: 10 micron, the light transmittance: 45%, the glossiness Gs (60°): 60%, the pencil hardness: 4H).

This CRT filter was cut out so that the periphery thereof because slightly larger than the escutcheon of the CRT of the size of 14 inches, and was interposed between the escutcheon and the CRT. A hole of a diameter of 1 mm was formed in the edge of the CRT filter, and a conductive paint (the content of silver: 60 weight %) was painted in the hole, attaching a conductive two-sided pressure sensitive adhesive tape, and the conductive net in the CRT filter and the ITO layer were connected to the ground through the metal band attached to the periphery of the CRT. The images of the illumination light and the like onto the CRT screen and the clearness of the display image on the screen were observed by the eyes, but no problem occurred. On the other hand, the voltage of the electrostatic charges on the CRT screen was 50 to 300 V after the CRT switch was turned on, while the voltage was 400 to 500 V just after the switch was turned off. Even when the finger touched the periphery of the filter, no electric shock was felt. The intensity of electric field of noise when the CRT filter was attached was measured by a VCCI method (Voluntary Control Council for Interference by Data Processing Equipments and Electronic Office Machines) (The second type: the measuring distance: 3 m), thereby evaluating the shielding property of the electromagnetic waves of the filter. The results are shown in Table 1.

EXAMPLE 4

Three transparent conductive layers consisting of ITO, silver, and ITO (hereinafter, abbreviated as an ITO/Ag/ITO) were continuously formed by an ion plating method onto one side of the film of polyethyleneterephthalate having a thickness of 75 micron, a width of 40 cm, and a length of 200 m (the electric resistance on the side of ITO/Ag/ITO: 20 Ω/□). By use of this film, the CRT filter having such a shape as to be closely adhered onto the front surface of the CRT was formed so that the ITO/Ag/ITO side was located on the side opposite to the CRT screen by a method similar to Example 1. In addition to this filter, a glass plate of such a shape as to be closely attached onto the front surface of the CRT of the size of 14 inches and having a size slightly larger than the escutcheon was produced from a glass plate of a thickness of 2.0 mm. The surface of the CRT filter on the side opposite to the CRT was treated using hydrofluoric acid.

An adhesive agent was coated between the glass plate on the side of the CRT and the film on the side of ITO/Ag/ITO, thereby adhering the glass plate and the film having ITO/Ag/ITO. Next, one of the portions of the film which are slightly exposed to the outside was left and the other exposed portions of the film were cut out to obtain the CRT filter (the light transmittance: 60%, the glossiness Gs (60°): 60%, the pencil hardness: 9H). Polyvinyl butyral was sandwiched in between the CRT filter on the side of the laminated film and the front surface of the CRT and thermally pressed. The ITO/Ag/ITO of the exposed film and the metal band attached to the periphery of the CRT were connected using a pressure sensitive adhesive tape made of copper foil with embosses and grounded. The formation of the illumination light and the like onto the CRT screen and the clearness of the display image on the screen were observed by the eyes, but no problem occurred. On the other hand, the voltage of the electrostatic charges on the CRT screen was 100 to 300 V after the CRT switch was turned on. The voltage was 200 to 500 V just after the switch was turned off. Even when the finger touched the periphery of the filter, no electric shock was felt. The noise field intensity was measured in a manner similar to Example 3, thereby evaluating the shielding property of the filter to the electromagnetic waves. The results are shown in Table 1.

TABLE 1

| Frequency (MHz) | Intensity of Electric Field of Noise (dB μV/m) Comparison Example: No CRT Filter | Example 3 | Example 4 |
|---|---|---|---|
| 63.16 | 35.7 | 20.8 | 25.0 |
| 63.91 | 30.9 | 21.0 | 26.0 |
| 67.70 | 30.1 | 20.0 | 25.0 |
| 71.89 | 35.0 | 17.0 | 22.0 |

What is claimed is:

1. A CRT filter which consists of a film having a thickness of 10 to 250 micron and a shape so as to be closely attached onto a front surface of a CRT, wherein a transparent conductive film whose light transmittance is 30 percent or more at a wavelength of 550 nm and whose surface electric resistance value is 100 kΩ/□ or less is provided on at least one side of said film.

2. A CRT filter according to claim 1, wherein a sheet or plate having a thickness of 0.1 mm or more is laminated onto one side or both sides of said filter.

3. A CRT filter according to claim 1, wherein a transparent conductive film whose surface electric resistance value is 200 Ω/□ or less is provided on at least one side of said filter.

4. A CRT filter according to claim 1, wherein a glossiness [Gs (60°)] of the film on the side opposite to the CRT surface is 40 to 90 percent.

5. A CRT filter according to claim 1, wherein a pencil hardness of the filter on the side opposite to the CRT surface is 3H or more.

6. A CRT filter which consists of a transparent film having a thickness of 10 to 250 micron and having a shape so as to be closely attached onto a front surface of a CRT, wherein a transparent conductive film whose light transmittance is 30 percent or more at a wavelength of 550 nm and whose surface electric resistance value is 100 kΩ/□ or less is provided on at least one side of said shaped film.

* * * * *